US00RE38782E

(19) United States
(12) Reissued Patent
Dix

(10) Patent Number: US RE38,782 E
(45) Date of Reissued Patent: Aug. 30, 2005

(54) INTERACTIVE BLANKET AND PILLOW FOR CHILDREN

(75) Inventor: Julie M. Dix, Paxton, MA (US)

(73) Assignee: Taggies, Inc., Spencer, MA (US)

(21) Appl. No.: 10/317,674

(22) Filed: Dec. 12, 2002

Related U.S. Patent Documents

Reissue of:
(64) Patent No.: 6,427,265
Issued: Aug. 6, 2002
Appl. No.: 09/728,646
Filed: Dec. 1, 2000

U.S. Applications:
(60) Provisional application No. 60/168,449, filed on Dec. 2, 1999.

(51) Int. Cl.[7] ..... A47G 9/02
(52) U.S. Cl. ..... 5/482; 5/502; 5/655; D6/601
(58) Field of Search ..... 5/482, 502, 655, 5/417, 420, 658, 636; 446/227; D6/595, 596, 601, 603

(56) References Cited

U.S. PATENT DOCUMENTS

| | | | | | |
|---|---|---|---|---|---|
| 1,474,738 | A | * | 11/1923 | Thierjung | 5/498 |
| 2,078,022 | A | * | 4/1937 | Roemer | 446/227 |
| 2,677,834 | A | * | 5/1954 | Moynihan | 128/872 |
| 4,540,219 | A | * | 9/1985 | Klinger | 297/487 |
| 4,959,879 | A | * | 10/1990 | Marxhausen | 5/636 |
| 4,968,279 | A | * | 11/1990 | Smith | 446/71 |
| 4,989,285 | A | * | 2/1991 | Troncone et al. | 5/482 |
| 5,027,457 | A | * | 7/1991 | Sweet | 5/640 |
| 5,159,727 | A | * | 11/1992 | McCracken | 5/655 |
| 5,167,565 | A | * | 12/1992 | Metcalf | 446/491 |
| D333,585 | S | * | 3/1993 | DeStefanis | D6/601 |
| 5,208,934 | A | * | 5/1993 | Bachnick et al. | 5/482 |
| D339,708 | S | * | 9/1993 | DeStefanis | D6/601 |
| D340,379 | S | * | 10/1993 | Cain | D6/601 |
| 5,509,157 | A | * | 4/1996 | Story | 5/490 |
| D371,266 | S | * | 7/1996 | Ward | D6/596 |
| 5,540,609 | A | * | 7/1996 | Hoag | 446/26 |
| 5,546,620 | A | * | 8/1996 | Matthews | 5/655 |
| 5,551,687 | A | * | 9/1996 | Krull | 473/573 |
| D378,969 | S | * | 4/1997 | Roan | D6/603 |
| 5,735,004 | A | * | 4/1998 | Wooten et al. | 5/502 |
| D397,902 | S | * | 9/1998 | Knorrek | D6/601 |
| D414,366 | S | * | 9/1999 | Harwich | D6/598 |
| D419,357 | S | * | 1/2000 | Atkinson | D6/603 |
| 6,038,720 | A | * | 3/2000 | Matthews et al. | 5/639 |
| 6,105,186 | A | * | 8/2000 | Stone Munson | 5/482 |
| 6,113,454 | A | * | 9/2000 | Mitchell | 446/227 |
| D479,938 | S | * | 9/2003 | Quirk et al. | D6/603 |
| 6,684,422 | B2 | * | 2/2004 | LeFevre et al. | 5/496 |
| 2003/0159193 | A1 | * | 8/2003 | LeFevre et al. | 2/69.5 |

FOREIGN PATENT DOCUMENTS

| | | | | |
|---|---|---|---|---|
| WO | WO 94/09689 | * | 5/1994 | A47G/9/00 |

OTHER PUBLICATIONS

Web Site—"Washables Toys from the First Years are Good, Clean Fun," Oct. 24, 1998, http://www.thefirstyears.com/s_whats_new press_98_10_24a.html.*

(Continued)

*Primary Examiner*—Robert G. Santos
(74) *Attorney, Agent, or Firm*—Holland & Bonzagni, P.C.

(57) ABSTRACT

An interactive security blanket for children comprises two fabric sheets sewn together to provide a blanket body. One of the sheets preferably has a colorful children's pattern or design, while the other is provided in a complimentary solid color. Additionally, a plurality of spaced-apart ribbon loops, or "tags," are attached to the four edges of the blanket body, and extend out therefrom. The lengths of ribbon comprising the tags are looped from and back into the seam between the pieces of fleece, and are firmly attached at that seam. The tags are provided in a variety of colors, patterns, and textures, e.g., they may be wide, thin, silky, textured, bright-colored, pastel, shiny, solid, and/or provided with fabric prints suitable for children. The tags function as a means for providing sensory stimulation for children via the children's passive (ocular) or active (tactile) interaction with the pillow or blanket.

19 Claims, 1 Drawing Sheet

OTHER PUBLICATIONS

Web Site—"Perfect–Baby–Gift.com," http://www.Perfect–baby–gift.com.*
U.S. Consumer Product Safety Commission, "Small Parts Regulations—Toys and Products Intended for Use By Children Under 3 Years Old".
16 CFR 1501—Choking Hazards / 16 CFR 1508—Full Size Crib Design.
16 CFR 1500.50–1500.53—Test Methods for simulating use and abuse of toys and other articles intended for use by children.
16 CFR 1610—Standard for the Flammability of Clothing Textiles.
Photograph (color and black & white) Tag Along Tags(tm) Pocket Size Security Blanket.
Letter of Sep. 16, 2003 from Attorney for assignee Taggies, Inc.
Attachment to Letter of Sep. 16, 2003 (U.S. Pat. No. 6,427,265).
Affidavit of Teresa Drummond, inventor of Tag Along Tags(tm) portable security blankets.
1994 Photograph (color and black & white) Samples of Tag Along Tags(tm) portable security blankets—longer fabric loops.
1994 Photograph (color and black & white) Samples of Tag Along Tags(tm) portable security blankets—shorter fabric loops.
1992 Photograph (color and black & white) Tag Along Tags(tm) portable security blanket—square shape, 16 fabric loops.
1995 Photograph (color and black & white) Tag Along Tags(tm) portable security blanket—square shape, 16 fabric loops.
1995 Photograph (color and black & white) Tag Along Tags(tm) portable security blanket—circular shape, 8 fabric loops.
1994 Photograph (color and black & white) Tag Along Tags(tm) portable security blanket—square shape, 16 fabric loops.
1994 Photograph (color and black & white) Tag Along Tags(tm) portable security blanket—circular shape, 16 fabric loops, "furry" fabric.
U.S. Appl. No. 29/028,845, filed Sep. 23, 1994, Teresa Drummond, inventor.
Mar. 13, 1995 Purchase Order—sale of 144 Tag Along Tags(tm) portable security blankets in various colors and designs.
1995 Form 1040, Schedule C showing sale of Tag Along Tags(tm) portable security blankets.
1994 Tag Along Tag Kit assembly instructions.
Affidavit of Pamela D. Crosby—purchase of Tag Along Tags(tm) portable security blankets in 1995.
Sketch of Tag Along Tags(tm) portable security blankets purchased by Pamela D. Crosby in 1995.
Photograph (color and black & white) Samples of Tag Along Tags(tm) portable security blankets similar to those purchased by Pamela D. Crosby.
Affidavit of Stella M. DeCarli—purchase of Tag Along Tags(tm) portable security blankets in 1996.
Photograph (black & white) Tag Along Tags(tm) portable security blanket purchased by Stella M. DeCarli in 1996.
Affidavit of Hermione Mickle—purchase of Tag Along Tags(tm) portable security blanket in 1995, on consignment sale in 1994.
Photograph (color and black & white) Samples of Tag Along Tags(tm) portable security blankets purhased by and on sale by Hermione Mickle in1994.
Affidavit of Cynthia Stern—purchase of Tag Along Tags(tm) portable security blanket in 1998.
Photograph (black & white) Tag Along Tags™ portable security blanket similar to the one purchased by Cynthia Stern in 1998.
Affidavit of Kathy Hayes—purchase of Tag Along Tags(tm) portable security blanket in 1994.
Photograph (black & white) Tag Along Tags(tm) portable security blanket purchased by Kathy Hayes in 1994.
Affidavit of Wendy Smith Clark—purchase of Tag Along Tags(tm) portable security blankets in 1994.
Photograph (color and black & white) Tag Along Tags(tm) portable security blankets purhased by Wendy Smith Clark in1994.
Letter from Wendy Smith (now Wendy Smith Clark) dated Jan. 28, 1994.
Affidavit of Patricia Loew—obtained Tag Along Tags™ portable security blankets on consignment, on–sale in 1994 and 1995 at craft shows.
Photograph (black & white) Tag Along Tags™ portable security blankets on sale by Patricia Loew in1994 and 1995.
Affidavit of—June Downing purchase of Tag Along Tags™ portable security blankets and on sale in the Something Special Gift Shop beginning in 1994.
Photograph (color and black & white) Tag Along Tags™ portable security blankets on sale in the Something Special Gift Shop in 1994.

* cited by examiner

INTERACTIVE BLANKET AND PILLOW FOR CHILDREN

Matter enclosed in heavy brackets [ ] appears in the original patent but forms no part of this reissue specification; matter printed in italics indicates the additions made by reissue.

This application claims priority from a Provisional Application, Ser. No. 60/168,449, filed Dec. 2, 1999.

FIELD OF THE INVENTION

The present invention relates to child care devices, and, more particularly, to blankets or pillows for children.

BACKGROUND OF THE INVENTION

It is well known that oftentimes a young child will become attached to a small, personal object as a means of coping with stress. Such a "security" item, which will typically be in the form of a favorite doll or a blanket, can actually provide substantial psychological and physiological benefits, especially when the child is out of the presence of a parent. For example, studies have found that if a child undergoes medical treatment without parents present, the child will be much calmer and more cooperative, and will actually have a reduced heart rate and blood pressure level, if the child has a security blanket or other item in his or her possession during the exam or treatment.

Typically, the chosen security blanket or item will be something with which the child is familiar and uses or plays with every day. Frequently, it will be a crib blanket or baby blanket also used for bedding during nap time or during the night. Although such blankets are functional, both as bedding and as security objects, they are typically disadvantageous for several reasons. The first of these is that the security blankets might not be conveniently portable. Because of the child's affection for the security blanket, it is usually taken along with the child wherever he or she goes. If the particular security blanket is relatively large, this may pose a problem for parents and the child, and the blanket may be dragged along the ground (thus getting dirty), or it may knock things over in stores. Another drawback to traditional blankets is that they may be less than ideally sturdy or appropriate for frequent use. For example, even if a hand-knit baby blanket given as a gift from a grandparent is occasionally used as bedding, parents may want to ensure it survives as a keepsake and is not "loved to death" as a security blanket.

Additionally, traditional blankets offer no other benefits besides being usable as blankets and as security items. Thus, in many situations (eg., if a child has to wait for a parent to do something or is traveling in a car), toys or other distractions may need to be given to the child in addition to ensuring the child has his or her security blanket. This may not always be convenient or possible. Finally, traditional blankets do not provide much, if any, sensory stimulation (either active or passive) for furthering a child's development.

More specifically, most blankets that are available today typically consist of one sheet of plain colored fabric, which at most may have a satin border around the perimeter of the blanket. Likewise, pillows that are available to children are either typical, plain sleeping pillows, or they have characters (cartoon/film characters) thereon which also do not provide any soothing activity at rest time.

Of course, a multitude of products are available for providing developmental stimulation for babies and young children. These include mobiles, wall hangings, toys, and stuffed animals. An example of the latter is a currently available product called a Taggly™, which is a stuffed animal which has multiple tabs attached to its head. The tabs on this toy crinkle, squeak, and have a velvet feel, but the Taggly™ is a toy, not a blanket or pillow, and cannot be used as such. Plus, it is typically not the type of object that is most frequently chosen by children as a security object.

Several blankets have been proposed over the years for providing various types of stimulation for young children. For example, U.S. Pat. No. 4,989,285 to Troncone et al. discloses a dual-layer blanket comprising two sheets of different fabrics connected only about their common peripheries, so that the interior areas of the sheets can slide over one another. This sliding effect, with appropriately chosen fabrics, simulates the tactile response of the amnion lining and amniotic fluid experienced by a fetus in utero. Additionally, U.S. Pat. No. 5,167,565 to Metcalf ("Metcalf") relates to a standard blanket that is provided with a plurality of "attractors," which are differently-patterned patches sewn onto the center area of the blanket. The attractors are attached to the blanket only via no more than two edges, so that they can be slightly lifted off the surface of the blanket. Although the attractors may provide some degree of stimulation via their different patterns, the design in Metcalf is disadvantageous in that the attractors cannot be very securely sewn onto the body of the blanket, making the blanket less than ideal for use with small children. More specifically, it is generally difficult to provide a secure stitching connection to the center of a fabric sheet, and it is nearly impossible to do so without leaving the stitching partially exposed. Furthermore, having a number of patches all over the surface of the blanket renders it less comfortable for use as a blanket.

Other blankets on the market contain actual toys or stuffed animals affixed to the blanket, which makes the blanket bulky and therefore not very "snuggly" or compact. One such blanket is shown in U.S. Pat. No. 5,208,934 to Bachnick et al. Another, commonly available security blanket, is called a Lovie™. This product is a stuffed animal head which has a plain blanket with a satin bottom edge attached to it. The animal head can act as a toy, but has no other developmental, stimulation or interaction features. As such, its appeal and usefulness are limited.

Accordingly, it is a primary object of the present invention to provide an interactive security blanket or pillow that is easily portable, that is sturdy, that still serves as a functional blanket or pillow, and that includes advantageously "low-tech" features with which a child can interact so as to receive sensory and developmental stimulation.

SUMMARY OF THE INVENTION

The present invention discloses security blankets that provide a comforting, stimulating experience for young children. Each security blanket preferably comprises two sheets of 100% polyester fleece sewn together to provide a blanket body that is machine washable. The front piece of fleece preferably has a colorful children's pattern or design, while the back is a complimentary solid color. Additionally, a plurality of spaced-apart ribbon loops, or "tags," are attached to the four edges of the blanket body, and extend "radially" out therefrom. The ribbon loops are provided in a variety of colors, patterns, and textures, e.g., they may be wide, thin, silky, textured, bright-colored, pastel, shiny, solid, and/or provided with fabric prints suitable for children. The ribbon is looped from and back into the seam between the pieces of fleece, and are firmly attached at that seam. The present invention may also be embodied in a pillow by inserting a standard pillow or cushion between two appropriately dimensioned fleece sheets.

The present invention provides children with a soft, warm security blanket, wherein the opposing portions of the tags can be rubbed together for comfort, much as the satin edge of a typical blanket might be rubbed for comfort. This provides the child with a sense of comfort and relaxation so as to sooth or calm the child. At the same time, the tags are colorful and enticing to children of all ages. The attractiveness of the individual ribbons encourages young children to reach into their environment. This develops basic skills in a manner that builds self-confidence while also providing entertainment for the child.

The tags, besides being visually and texturally enticing, also provide a series of mini-handles for children to grab and play with. In this sense, besides providing further entertainment and stimulation, the tags also help children in developing motor skills and coordination, especially in newborns and infants. For example, babies and children practice very complex fine motor skills, typically with much energy and excitement, when they attempt to touch and feel the tags, for example by trying (and succeeding) to place the soft fabric of the tags between their fingers, or by trying to put their finger through the tag loops. Furthermore, infants and newborns who can not yet grasp the blanket will try to reach for it and will intently study the individual patterns on the various tags when the blanket is "propped" up for them. This helps to develop eye/hand coordination in the young or developmentally delayed. Babies often select a "favorite" tag, which is often the busiest of patterns, because it is visually stimulating. Also, children may obtain developmental stimulation from hearing the sounds produced when the ribbon loops are rubbed together.

The unique design and concept of the interactive blanket of the present invention is extremely attractive to young children because it incorporates a tactile and stimulating activity into a soothing, comforting object. Babies and children are drawn to clothing labels and satin ribbons on stuffed animals because they enjoy the feel of rubbing the labels or ribbons together, and therefore find the generous offering of several assorted ribbon loops of different textures, prints and colors in the interactive blanket or pillow to be interesting and fun. At the same time, the soft fleece blanket body that holds their favorite tags is warm, cuddly and snuggly. The combination of these factors and the ability of the child to tote the blanket around (as opposed to other blankets, which are typically larger) makes the interactive blanket or pillow an ideal child companion. Additionally, children enjoy using the blanket for multiple purposes and for rest time and for play. For example, children may use the interactive blanket of the present invention as an imaginary blanket for a doll.

The interactive blankets of the present invention are also very attractive to adults purchasing the blankets for children, for several reasons. First, the interactive blankets are preferably constructed so as to be safe for young children, thereby making excellent security items that can be used in a safe and conventional manner as blankets and that are easily transported (children with security blankets or other security items often wish to bring their items with them to new environments such as school, the doctor's office, or a new babysitter's house). In addition, adults also find the interactive blanket and pillow design, and the assorted patterns that are available, to be inviting and fun. Furthermore, and perhaps most importantly, the blankets are intended to promote both visual and fine motor skills in children, as discussed above, even while keeping things simple for young children, who are often bombarded with items that provide an excess of activities.

BRIEF DESCRIPTION OF THE DRAWINGS

These and other features, aspects, and advantages of the present invention will become better understood with respect to the following description, appended claims, and accompanying drawings, in which:

DETAILED DESCRIPTION OF THE PREFERRED EMBODIMENTS

Figure 1:
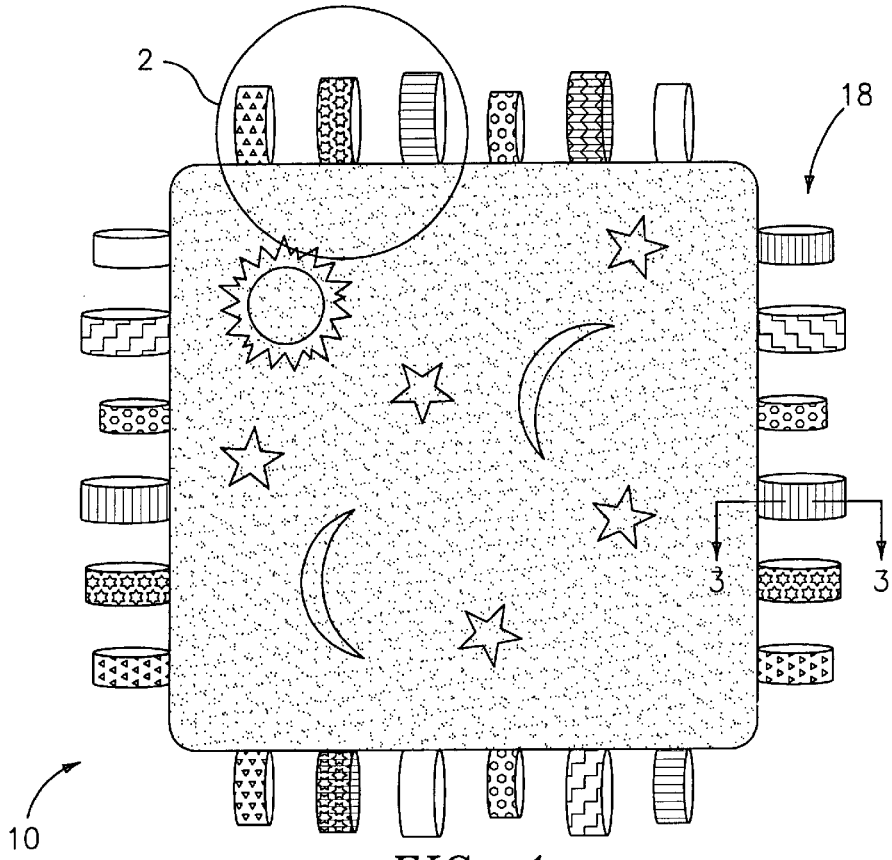
FIG. 1 is a top plan view of an interactive blanket or pillow according to the present invention.
Figure 2:
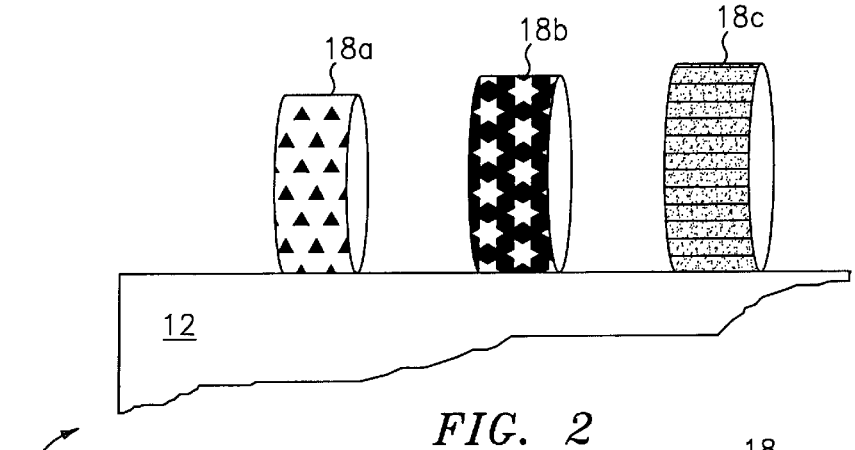
FIG. 2 is a detail view of an edge portion of the interactive blanket or pillow shown in FIG. 1.
Figure 3:
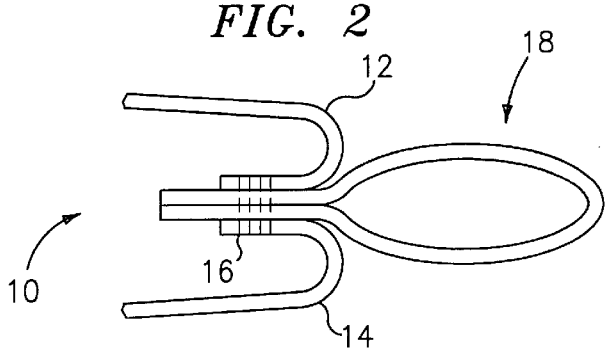
FIG. 3 is a cross-sectional view of a looped ribbon attached to the edge of the interactive blanket or pillow shown in FIG. 1, according to one exemplary attachment arrangement.

Turning now to FIGS. 1–3, preferred embodiments of an interactive blanket 10 or pillow (not separately numbered) for children, according to the present invention, will now be given. These interactive blankets and pillows are marketed by Taggies, Inc. of Paxton, Mass. under the trademark "TAGGIES," and are available for purchase on-line at www.tagaies.com. The blanket 10 comprises top and bottom sheets of fabric 12, 14 attached together about their peripheries via stitching 16. A plurality of spaced-apart ribbon loops ("tags") 18 are disposed between and extend out from the edges of the sheets 12, 14, and are attached thereto by virtue of the stitching 16. The tags 18 have a number of different patterns, textures, and colors, so as to provide visual and tactile stimulation for children. Additionally, the tags 18 protruding from the edges of the sheets 12, 14 entice youngsters to practice fine motor skills.

The fabric sheets 12, 14 are preferably polyester fleece, which, besides being sturdy and machine washable, provides a very soft and welcoming texture. One sheet 12 may be provided with a pattern, as indicated in FIG. 1, while the other sheet 14 may be provided in a solid, complementary color. Alternatively, other types of fabrics may be used, and both sheets may be patterned or solid, as desired.

As mentioned above, and as shown in FIGS. 2 and 3, the tags 18 comprise lengths of ribbon (e.g., single face or grosgrain) or fabric whose ends are attached between the peripheral edges of the sheets 12, 14, thereby forming a plurality of ribbon loops that extend out past the common edge of the sheets 12, 14. The tags 18 function as a means for providing sensory stimulation for children via the children's passive (ocular) or active (tactile, auditory, etc.) interaction with the pillow or blanket 10. The tags 18 preferably protrude about 1.5 inches (3.8 cm) past the edge of the sheets 12, 14, and are preferably evenly spaced about 1.5 inches (3.8 cm) apart from one another, e.g., in both cases, from about one inch (2.5 cm) to about two inches (5 cm) is typically suitable. Although other lengths are possible, this range of tag lengths provides a good balance between accessibility and safety. More specifically, in order to prevent a choking hazard, the tags should not be too long. However, if they are not long enough, they cannot be optimally manipulated by children, who, as further discussed below, should be able to rub the opposing sides of the tags together and insert their fingers through the loops.

Similarly, although any inter-tag spacing can be chosen, the range noted above allows children to focus on individual tags, while still providing a reasonable number of tags on any given blanket or pillow 10.

As indicated in FIGS. 1 and 2, the tags 18 are provided in a number of different colors, patterns, and textures. Thus, for example, a first tag 18a might have a first color (or combination of colors) with a first pattern and a first texture, a second tag 18b might have a second color (or combination of colors) with a second pattern and the same, first texture, and a third tag 18c might have a third color, no pattern, and a different, second texture. Each tag on the blanket 10 is preferably unique to the blanket (i. e., each tag 18 on a blanket 10 will be different in some respect from the other tags on the blanket), as this provides the most variety and developmental impetus. However, as should be appreciated, the tags 18 do not each have to have a unique combination of color, texture, and pattern, and, if desired, multiple iterations of the same tag may be provided on the same blanket. The tags 18 are preferably made of polyester for durability and wash-ability, although any type of fabric or material can be used.

As discussed above, the tags 18 provide a number of functions. The multiple, varied colors and patterns provide visual stimulation for children, and make the blanket 10 generally uniquely attractive. Additionally, since the tags 18 have different textures, different tactile sensations are conferred when the tags 18 are touched. Furthermore, because of the loop-like nature of the tags, children are able to rub the opposed sides of the tags together between their fingers. This provides a further, different range of tactual sensation, since rubbing the opposed sides of the tags together between the fingers creates a different sensation than just rubbing or stroking the fabric of the tags by itself. The loop-like tags 18 also help children develop basic motor skills, since babies and young children are drawn to inserting their fingers through the tag loops. Also, the tags 18 can be used by children as a series of "mini-handles," further increasing the attractiveness and usefulness of the blanket 10.

As should be appreciated, the blanket or pillow 10 can be provided in any size as desired. However, it has been found that certain sizes are well suited for certain uses. For example, a small interactive blanket 10 for general use, but particularly portable, is preferably about twelve inches by twelve inches (about 30 cm by 30 cm), with five tags 18 along each edge of the blanket 10. A larger, but still easily portable blanket 10, is preferably about eighteen inches by eighteen inches (about 46 cm by 46 cm), and has six tags 18 along each edge of the larger interactive blanket 10, while a blanket 10 suitable for use in a crib or playpen is preferably about thirty-four inches by forty-five inches (about 86 cm by 114 cm), with approximately eleven ribbon loops along the thirty-four inch edge and sixteen along the forty-five inch edge.

The interactive pillow 10 according to the present invention is preferably about ten inches by twenty inches (25 cm by 50 cm), with four tags 18 along the ten inch edge and seven tags 18 along the twenty inch edge. The interactive pillow 10 is stuffed with a new travel-sized pillow and then sewn closed, or, alternatively, is stuffed with some other type of padding, preferably in its own casing. As should be appreciated, the sheets 12, 14 for the pillow will necessarily be larger (e.g., twelve inches by twenty-two inches in the case of a ten inch by twenty inch pillow) than the finished dimensions of the pillow 10, to accommodate the inner travel pillow or padding.

Optionally, knots of embroidery floss (not shown) complimentary in color to the colors of the sheets 12, 14 may be provided on the body of the blanket 10. Additionally, the blankets 10 may be provided with polyester batting (e.g., the blanket 10 suitable for cribs is preferably stuffed with a half inch (1.3 cm) layer of batting).

FIG. 3 shows a detail (with dimensions exaggerated for clarity) of one way in which the tags 18 may be attached to the edge of the blanket or pillow 10. The tags 18 may be attached according to other arrangements.

Except at set forth above, the patterns, colors and textures of the ribbon or material for the tags 18 may be of any type as desired, although preferably they are chosen for their potential attractiveness or interest to children. Therefore, a variety of bright colors (blues, greens, yellows, reds, oranges, etc.), textures (silky, satiny, coarse, ridged (corduroy), etc.) and patterns (alternating lines, stripes, paisleys, polka-dots, etc.) are appropriate, keeping in mind that the interactive blanket or pillow 10 should remain sturdy and functional.

Since the interactive blanket sand pillows 10 are used by children, child- and fire-proofing features are paramount. Every attempt should be made to ensure that the interactive blankets and pillows 10 are safe for children to enjoy. Preferably, each tag 18 is "backtacked" as it is sewn between the sheets 12, 14 for added strength. Additionally, the blankets and pillows 10 are preferably constructed inside out, on industrial sewing machines, with the fleece sheets 12, 14 being sewn together one inch (2.5 cm) in from their edges, and the tags 18 being placed such that they are secured to the sheets 12, 14 at least one-quarter of an inch (0.6 cm) away from the ribbons' ends.

Before commercial production, the blankets and/or pillows 10, as available for purchase from the assignee of this invention, Taggies, Inc., were tested by a laboratory certified by the Consumer Safety Products Commission (e.g., to test the ribbons against the small-parts regulations for choking hazards). Also, the interactive blankets and pillows 10 were tested to determine that they meet the flammability standards as set forth by the ASTM. If any parties seek to utilize the teachings set forth herein to commercially manufacture their own blankets, pillows, or otherwise, e.g., under a license or subsequent expiration, it is recommended that they do so as well. Also, Sudden Infant Death Syndrome (SIDS) concerns or precautions should be considered with respect to the interactive pillows. For example, it may be necessary to only use the interactive pillows with children older than twelve months. Also, the blankets and pillows may be labeled with precautionary information so that parents are aware (or can become educated) of the potential risks (if any) involved in using the interactive blankets and pillows with children of various age groups (as they should for all products for children).

Other embodiments of the present invention may include full crib sets (bumper pads), sleeping bags, pillow cases, activity blankets, and other types of bedding articles. In each instance, the particular children's product will be provided with a plurality of tags 18 acting as features for child stimulation and interaction.

Although the interactive blankets and pillows have been illustrated as being made from particular fabrics or materials, one of ordinary skill in the art will appreciate that certain changes could be made without departing from the spirit and scope of the invention. For example, other materials or fabrics could be used, and non-rectangular blanket or pillow shapes (e.g., circular, oblong, triangular, pentagonal, hexagonal) could be used.

Additionally, although the ribbon-loop tags have been illustrated as being attached to the periphery of the blanket, they could also be attached to the central area of the blanket, without departing from the spirit and scope of the invention. Furthermore, although the tags have been shown as comprising ribbon loops, one of ordinary skill in the art will appreciate that the tags attached to the periphery of the blanket could also be in other forms, such as strips. However, that would defeat the purpose of having loops for little fingers to be inserted to grasp the item, and would make the tags potentially less tactually stimulating, since it would be less easy to rub the tags against themselves.

Also, although the blanket or pillow body of the present invention has been illustrated as comprising two fleece sheets attached to one another, one of ordinary skill in the art will appreciate that the blanket or pillow bodies could be more "complex" structures comprising various types of fabric sewn together, without departing from the spirit and scope of the invention. For example, the fabric sheets could be quilt-like, or the fleece sheets could be provided with a satin border, to which the tags are attached.

Since certain changes (including those listed above) may be made in the above described interactive blanket and pillow for children, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. An interactive bedding article for children comprising:

a. a fabric body; and b. a plurality of spaced-apart fabric loops attached to the fabric body, wherein:

c. the fabric loops extend from about one inch to about two inches past the periphery of the fabric body, such that the fabric loops do not create a choking hazard but are long enough for children to insert their fingers through the fabric loops and to use the fabric loops for carrying the bedding article; and d. the fabric loops are provided in a number of different patterns, colors, and textures; whereby children are visually stimulated by the varied patterns and colors and are tactually stimulated by touching the fabric loops and rubbing opposed portions of the fabric loops together between their fingers.

2. The interactive bedding article of claim 1 wherein:

a. the fabric body comprises: a top sheet; and a bottom sheet non-removably attached to the top sheet about a common periphery; and b. the fabric loops are securely non-removably attached to the fabric body between the peripheral edges of the top and bottom sheets such that the fabric loops cannot be opened or removed from the fabric body by children.

3. The interactive bedding article of claim 2 wherein the fabric loops are attached to the top and bottom sheets by a plurality of stitches extending through the top and bottom sheets and the fabric loops.

4. The interactive bedding article of claim 2 wherein the fabric loops comprise lengths of ribbon having first and second ends and turned back over on themselves such that the first and second ends lie proximate one another, and said fabric loops being securely non-removably attached to the top and bottom sheets proximate the respective first and second ends of the fabric loops.

5. The interactive bedding article of claim 4 wherein the fabric loops are attached to the top and bottom sheets by a plurality of stitches extending through the top and bottom sheets and the first and second ends of the fabric loops.

6. An interactive bedding article for children comprising:

a. a fabric body comprising: a top sheet; and a bottom sheet non-removably attached to the top sheet about a common periphery; and b. a plurality of fabric loops extending past the periphery of the fabric body, wherein:

c. the fabric loops are securely non-removably attached to the fabric body between the peripheral edges of the top and bottom sheets such that the fabric loops cannot be opened or removed from the fabric body by children; and d. the fabric loops are provided in a number of different patterns, colors, and textures; whereby children are visually stimulated by the varied patterns and colors and are tactually stimulated by touching the fabric loops and rubbing opposed portions of the fabric loops together between their fingers.

7. The interactive bedding article of claim 6 wherein the fabric loops are attached to the top and bottom sheets by a plurality of stitches extending through the top and bottom sheets and the fabric loops.

8. The interactive bedding article of claim 6 wherein the fabric loops comprise lengths of ribbon having first and second ends and turned back over on themselves such that the first and second ends lie proximate one another, and said fabric loops being securely non-removably attached to the top and bottom sheets proximate the respective first and second ends of the fabric loops.

9. The interactive bedding article of claim 8 wherein the fabric loops are attached to the top and bottom sheets by a plurality of stitches extending through the top and bottom sheets and the first and second ends of the fabric loops.

10. The interactive bedding article of claim 8 wherein the fabric loops extend from about one inch to about two inches past the periphery of the fabric body, such that the fabric loops do not create a choking hazard but are long enough for children to insert their fingers through the fabric loops and to use the fabric loops for carrying the bedding article.

11. An interactive bedding article for children comprising:

a. a fabric body comprising: a top sheet; and a bottom sheet non-removably attached to the top sheet about a common periphery; and b. a plurality of spaced-apart fabric loops each comprising a length of ribbon having first and second ends and turned back over on themselves such that the first and second ends lie proximate one another, said fabric loops being securely non-removably attached to the fabric body between the peripheral edges of the top and bottom sheets by a plurality of stitches extending through the top and bottom sheets and the first and second ends of the fabric loops, such that the fabric loops cannot be opened or removed from the fabric body by children, wherein:

c. the fabric loops extend from about one inch to about two inches past the periphery of the fabric body, such that the fabric loops do not create a choking hazard but are long enough for children to insert their fingers through the fabric loops and to use the fabric loops for carrying the bedding article; and d. the fabric loops are provided in a number of different patterns, colors, and textures; whereby children are visually stimulated by the varied patterns and colors and are tactually stimulated by touching the fabric loops and rubbing opposed portions of the fabric loops together between their fingers.

12. An interactive bedding article for children comprising:

a. a bedding article body adapted to be tactually and visually pleasing to children; and b. a plurality of fabric loops attached to the bedding article body and adapted to be visually and tactually stimulating for children, wherein the fabric loops extend from about one inch to about two inches past the fabric body, such that the fabric loops do not create a choking hazard but are long enough for children to insert their fingers through the fabric loops and to use the fabric loops for carrying the bedding article, said loops being securely non-removably attached to the bedding article body such that the loops cannot be opened and/or removed from the bedding article body by children, *and wherein the bedding article has no fabric loops that extend beyond about two inches past the fabric body*.

[13. An interactive bedding article for children comprising:

a. a bedding article body adapted to be tactually and visually pleasing to children, said bedding article body having a periphery and comprising first and second fabric sheets non-removably attached to one another proximate a common boundary edge; and b. a plurality of fabric loops adapted to be visually and tactually stimulating to children, said fabric loops comprising lengths of fabric having first and second ends and turned back over on themselves such that the first and second ends lie proximate one another and form loop-shaped portions that extend past the periphery of the bedding article body, and said first and second ends being disposed between the first and second fabric sheets and securely non-removably attached to the bedding article body proximate their respective first and second ends, such that the fabric loops cannot be opened or removed from the fabric body by children.]

[14. The interactive bedding article of claim 43 wherein the fabric loops are attached to the first and second sheets by a plurality of stitches extending through the first and second sheets and the first and second ends of the fabric loops.]

[15. An interactive blanket for children comprising:

a. a fabric blanket body having a periphery and comprising:

i. a first fabric sheet having a top surface and a bottom surface; and ii. a second fabric sheet having substantially the same dimensions as the first fabric sheet and having a top surface and a bottom surface, the top surface of the second fabric sheet facing the bottom surface of the first fabric sheet and the second fabric sheet being non-removably attached to the first fabric sheet proximate a common boundary edge of the two sheets such that a peripheral area of the top surface of the first sheet is in contact with a peripheral area of the bottom surface of the second sheet; and b. a plurality of spaced-apart loops attached to the periphery of the fabric blanket body and adapted to provide visual, auditory, and/or tactile stimulation for children, said loops being securely non-removably attached to and extending out from between the peripheral area of the top surface of the first sheet and the peripheral area of the bottom surface of the second sheet by a plurality of stitches extending through the first and second sheets and the loops, such that the loops cannot be opened or removed from the fabric body by children.]

16. An interactive blanket for children comprising:

a. a blanket body having a periphery; and b. a plurality of spaced-apart loops attached to the periphery of the blanket body and adapted to provide visual, auditory, and/or tactile stimulation for children, said loops extending from about one inch to about two inches past the periphery of the blanket body, such that the loops do not create a choking hazard but are long enough for children to insert their fingers through the loops and to use the loops for carrying the blanket, wherein*:* (*i*) the loops are securely non-removably attached to the blanket body such that the loops cannot be opened and/or removed from the blanket body by children*; and* (*ii*) *the blanket has no loops that extend beyond about two inches past the periphery of the blanket body*.

[17. An interactive bedding article for children comprising:

a. a fabric body; and b. a plurality of spaced-apart loops attached to the fabric body, wherein the loops are adapted in size and shape for children: to insert their fingers through the loops; to use the loops for carrying the bedding article; and to rub opposed portions of the loops together between their fingers for tactile stimulation, and said loops being securely non-removably attached to the fabric body such that the loops cannot be opened and/removed from the fabric body by children.]

[18. An interactive bedding article for children comprising:

a. a fabric body; and b. a plurality of spaced-apart loops attached to the fabric body, wherein:

c. the loops are adapted in size and shape for children to insert their fingers through the loops and to use the loops for carrying the bedding article, but not to create a choking hazard for children;

d. the loops are adapted to provide visual, auditory, and/or tactile stimulation for children, and the loops are securely non-removably attached to the fabric body such that the loops cannot be opened and/or removed from the fabric body by children.]

*19. An interactive article for children comprising:*

*a. a body; and*

*b. a plurality of spaced-apart loops attached to the body, wherein the loops are adapted in size and shape for children; to insert their fingers through the loops; to use the loops for carrying the article; and to rub opposed portions of the loops together between their fingers for tactile stimulation, and said loops being securely non-removably attached to the body such that the loops cannot be opened and/or removed from the body by children; and wherein the loops are provided in a plurality of different colors, patterns, and/or textures for providing visual, auditory, and/or tactile stimulation for children.*

*20. An interactive article for children comprising:*

*a. a body; and*

*b. a plurality of spaced-apart loops attached to the body, wherein:*

*c. the loops are adapted in size and shape for children to insert their fingers through the loops and to use the loops for carrying the article, but not to create a choking hazard for children; and*

*d. the loops are provided in a plurality of different colors, patterns, and/or textures for providing visual, and/or tactile stimulation for children, and the loops are securely non-removably attached to the body such that the loops cannot be opened and/or removed from the body by children.*

*21. An interactive article for children comprising:*

*a. a fabric body; and*

*b. a plurality of lengths of fabric extending past the periphery of the fabric body, wherein:*

*c. the lengths of fabric have first and second ends and are turned back over on themselves such that the first and second ends lie proximate one another;*

*d. the lengths of fabric are securely non-removably attached to the fabric body such that the lengths of fabric content be opened or removed from the fabric body by children; and*

*e. the lengths of fabric are provided in a number of different patterns, colors, and textures; whereby children are visually stimulated by the varied patterns and colors and are tactually stimulated by touching the lengths of fabric and rubbing opposed portions of the lengths of fabric together between their fingers.*

*22. The interactive article of claim 21, wherein the lengths of fabric are securely non-removably attached to the fabric body by a plurality of stiches extending through the fabric body and the first and second ends of the lengths of fabric.*

*23. The interactive article of claim 21 wherein:*

*a. the interactive article is an interactive bedding article;*

*b. the fabric body comprises: a top sheet; and a bottom sheet non-removably attached to the top sheet about a common periphery; and*

*c. the lengths of fabric are securely non-removably attached between the peripheral edges of the top and bottom sheets by a plurality of stiches extending through the top and bottom sheets and the first and second ends of the lengths of fabric.*

*24. An interactive bedding article for children comprising:*

*a. a bedding article body adapted to be tactually and visually pleasing to children, said bedding article body having a periphery and comprising first and second fabric sheets attached to one another proximate a common boundary edge; and*

*b. a plurality of lengths of fabric adapted to be visually and tactually stimulating to children, wherein: (i) the lengths of fabric extend past the periphery of the bedding article body; have first and second ends; and are turned back over on themselves such that the first and second ends lie proximate one another; and (ii) the first and second ends are disposed between the first and second fabric sheets and are securely non-removably attached to the bedding article body proximate their respective first and second ends, whereby the lengths of fabric cannot be opened or removed from the fabric body by children.*

* * * * *

UNITED STATES PATENT AND TRADEMARK OFFICE

CERTIFICATE OF CORRECTION

PATENT NO. : RE 38,782 E
APPLICATION NO. : 10/317674
DATED : August 30, 2005
INVENTOR(S) : Julie M. Dix It is certified that error appears in the above-identified patent and that said Letters Patent is hereby corrected as shown below:

In Col. 11, line 18
replace "content"
with --cannot--.

Signed and Sealed this

Twenty-eighth Day of October, 2008

JON W. DUDAS
*Director of the United States Patent and Trademark Office*